(12) United States Patent
Goleski et al.

(10) Patent No.: US 10,132,404 B2
(45) Date of Patent: Nov. 20, 2018

(54) TRANSMISSION WITH INTEGRATED CLUTCH AND GEAR SET

(71) Applicant: FORD GLOBAL TECHNOLOGIES, LLC, Dearborn, MI (US)

(72) Inventors: Gregory Daniel Goleski, Rochester Hills, MI (US); Jeffrey Edward Maurer, Commerce, MI (US); Steven Gerald Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1331 days.

(21) Appl. No.: 13/923,488

(22) Filed: Jun. 21, 2013

(65) Prior Publication Data

US 2014/0378265 A1    Dec. 25, 2014

(51) Int. Cl.
*F16H 57/08* (2006.01)
*F16H 3/66* (2006.01)

(52) U.S. Cl.
CPC ............... *F16H 57/08* (2013.01); *F16H 3/66* (2013.01); *F16H 2057/087* (2013.01); *F16H 2200/0069* (2013.01); *F16H 2200/2012* (2013.01); *F16H 2200/2046* (2013.01)

(58) Field of Classification Search
CPC .... F16H 57/082; F16H 2057/087; F16H 3/66; F16H 2200/0069; F16H 2200/2012; F16H 2200/2046; F16H 2063/3036; F16H 57/08–57/10; F16H 3/44–3/78; F16H 475/305; F16H 475/284; F16H 475/269–475/328
See application file for complete search history.

(56) References Cited

U.S. PATENT DOCUMENTS

| | | | | |
|---|---|---|---|---|
| 3,487,726 A | * | 1/1970 | Burnett | F16H 3/54 192/18 A |
| 3,545,305 A | * | 12/1970 | Friend | F16D 43/18 192/105 BB |
| 3,554,057 A | * | 1/1971 | Michnay et al. | F16H 3/663 192/48.614 |
| 3,739,647 A | | 6/1973 | Crooks | |

(Continued)

FOREIGN PATENT DOCUMENTS

SU    564474 A  *  8/1977

OTHER PUBLICATIONS

Google Machine Translation of SU564474 provided by STIC; no translation date available.*

(Continued)

*Primary Examiner* — Roger L Pang
(74) *Attorney, Agent, or Firm* — James Dottavio; Brooks Kushman P.C.

(57) ABSTRACT

A transmission includes a simple planetary gear set and several clutches. A first clutch selectively couples the carrier of the planetary gear set to a first shell. The housing of the first clutch is integrated with the planetary carrier. A piston return spring extends axially to occupy space between the planet gears. A second and third clutch share a common housing that is fixedly coupled to the ring gear. The second clutch selectively couples the ring gear to the sun gear. The third clutch selectively couples the ring gear to a second shell. The planetary gear set is axially located between the two clutch housings.

4 Claims, 4 Drawing Sheets

(56) References Cited

U.S. PATENT DOCUMENTS

| | | | | |
|---|---|---|---|---|
| 3,757,605 A | * | 9/1973 | Morden | F16H 61/0293 475/266 |
| 4,346,629 A | * | 8/1982 | Kinzbach | E21B 19/164 81/57.15 |
| 4,450,735 A | * | 5/1984 | Koivunen | F16H 59/38 475/140 |
| 5,024,636 A | * | 6/1991 | Phebus | B60K 17/046 475/141 |
| 5,423,406 A | * | 6/1995 | Antonov | F16D 27/10 192/103 A |
| 5,846,153 A | * | 12/1998 | Matsuoka | B60K 17/08 192/3.52 |
| 6,929,576 B2 | | 8/2005 | Armstrong et al. | |
| 7,052,433 B2 | | 5/2006 | Sugiura et al. | |
| 7,931,556 B2 | * | 4/2011 | Diosi | F16H 57/0482 475/116 |
| 8,281,915 B2 | * | 10/2012 | Kato | F16D 25/0638 192/48.611 |
| 8,313,406 B2 | | 11/2012 | Braford, Jr. | |
| 8,939,862 B2 | | 1/2015 | Janson et al. | |
| 2007/0287575 A1 | * | 12/2007 | Hvolka | F16H 3/54 475/323 |
| 2012/0217120 A1 | * | 8/2012 | Janson | F16D 25/10 192/85.01 |

OTHER PUBLICATIONS

Dick, A., et al., Optimization Potential for a State of the Art 8-Speed AT, SAE Int. J. Passeng. Cars—Mech. Syst. 6 (2):2013, doi:10.4271/2013-01-1272.

* cited by examiner

TRANSMISSION WITH INTEGRATED CLUTCH AND GEAR SET

TECHNICAL FIELD

This disclosure relates to the field of automatic transmissions for motor vehicles. More particularly, the disclosure pertains to a configuration of clutches for use in a transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

A common type of automatic transmission utilizes a collection of clutches and brakes. Various subsets of the clutches and brakes are engaged to establish the various speed ratios. A common type of clutch utilizes a clutch pack having separator plates splined to a housing and interleaved with friction plates splined to a rotating shell. When the separator plates and the friction plates are forced together, torque may be transmitted between the housing and the shell. Typically, a separator plate on one end of the clutch pack, called a reaction plate, is axially held to the housing. A piston applies axial force to a separator plate on the opposite end of the clutch pack, called a pressure plate, compressing the clutch pack. The piston force is generated by supplying pressurized fluid to a chamber between the housing and the piston. For a brake, the housing may be integrated into the transmission case. For a clutch, the housing rotates. As the pressurized fluid flows from the stationary transmission case to the rotating housing, it may need to cross one or more interfaces between components rotating at different speeds. At each interface, seals direct the flow from an opening in one component into an opening in the interfacing component.

SUMMARY OF THE DISCLOSURE

A transmission includes a planetary gear set and three clutches. The first clutch includes a first housing fixedly coupled to the carrier of the planetary gear set, separator plates splined to the first housing, friction plates interleaved with the separator plates, and a piston configured to slide axially within the first housing. The first clutch may also include a piston return spring configured to force the piston away from the planetary gear set. The piston return spring may occupy space between the planet gears of the planetary gear set. The second and third clutches share a second housing fixedly coupled to the ring gear of the planetary gear set. The second and third clutches each include separator plates splined to the second housing, friction plates interleaved with the separator plates, and a piston configured to slide axially within the second housing. The friction plates of the second clutch may be splined to a hollow shaft extending through the first clutch housing and fixedly coupled to the sun gear of the planetary gear set. An input shaft may extend through the hollow shaft and through the second housing.

A planetary gear set includes a carrier, a sun gear, a ring gear, and a set of planet gears which rotate with respect to the carrier. The planet gears mesh with either or both of the sun gear and the ring gear. A return spring occupies space between the planet gears. The piston return spring may be a compression spring.

A clutch includes a housing configured to rotate about an input shaft and also configured to support a set of planet gears. The clutch also includes a set of separator plates splined to the housing along their inner edges, one or more friction plates interleaved with the separator plates, and a piston configured to compress the separator plates and friction plates. The clutch may also include a piston return spring that occupies space between the planet gears.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes.

Figure 1:
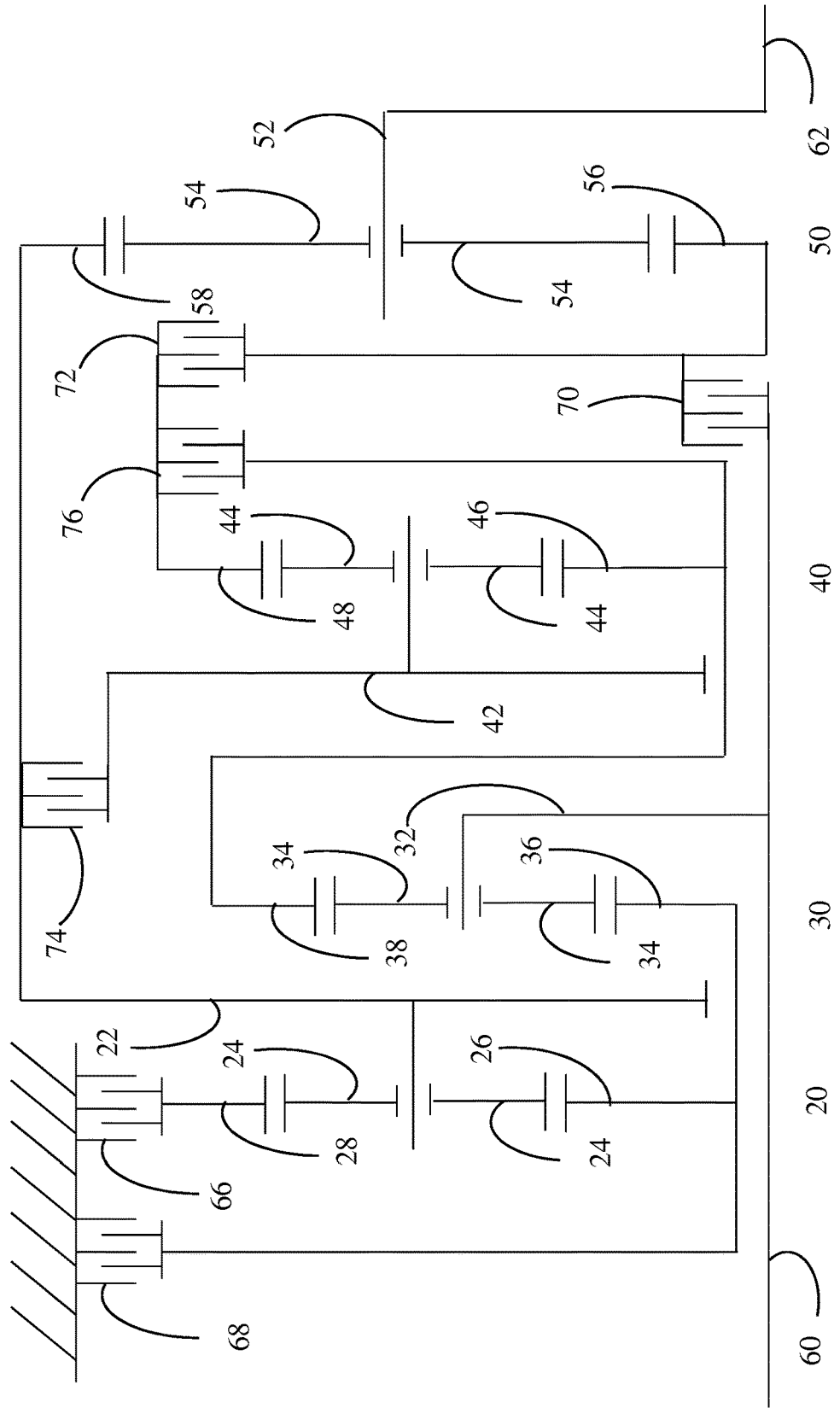
FIG. 1 is a schematic diagram of a transmission gearing arrangement.

An example transmission is schematically illustrated in FIG. 1. The transmission utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured.

A suggested ratio of gear teeth for each planetary gear set is listed in Table 1.

TABLE 1

| Ring 28/Sun 26 | 2.20 |
| Ring 38/Sun 36 | 1.75 |
| Ring 48/Sun 46 | 1.60 |
| Ring 58/Sun 56 | 3.70 |

In the transmission of FIG. 1, sun gear 26 is fixedly coupled to sun gear 36, carrier 22 is fixedly coupled to ring gear 58, ring gear 38 is fixedly coupled to sun gear 46, input shaft 60 is fixedly coupled to carrier 32, and output shaft 62 is fixedly coupled to carrier 52. Ring gear 28 is selectively held against rotation by brake 66 and sun gears 26 and 36 are selectively held against rotation by brake 68. Input shaft 60 is selectively coupled to sun gear 56 by clutch 70. Ring gear 48 is selectively coupled to sun gear 56 by clutch 72 and selectively coupled to ring gear 38 and sun gear 46 by clutch 76. Carrier 42 is selectively coupled to carrier 22 and ring gear 58 by clutch 74.

As shown in Table 2, engaging the shift elements in combinations of four establishes ten forward speed ratios and one reverse speed ratio between input shaft 60 and output shaft 62. An X indicates that the shift element is required to establish the speed ratio. An (X) indicates the shift element can be applied but is not required. In $1^{st}$ gear, either clutch 74 or clutch 76 can be applied instead of applying clutch 72 without changing the speed ratio. When the gear sets have tooth numbers as indicated in Table 1, the speed ratios have the values indicated in Table 2.

TABLE 2

|  | 66 | 68 | 70 | 72 | 74 | 76 | Ratio | Step |
| --- | --- | --- | --- | --- | --- | --- | --- | --- |
| Rev | X | X |  | X | X |  | −4.79 | 102% |
| $1^{st}$ | X | X | X | (X) |  |  | 4.70 |  |
| $2^{nd}$ | X | X |  | X |  | X | 2.99 | 1.57 |
| $3^{rd}$ | X |  | X | X |  | X | 2.18 | 1.37 |
| $4^{th}$ | X |  |  | X | X | X | 1.80 | 1.21 |
| $5^{th}$ | X |  | X |  | X | X | 1.54 | 1.17 |
| $6^{th}$ | X |  |  | X | X | X | 1.29 | 1.19 |
| $7^{th}$ |  |  | X | X | X | X | 1.00 | 1.29 |
| $8^{th}$ |  | X | X | X | X |  | 0.85 | 1.17 |
| $9^{th}$ |  | X | X |  | X | X | 0.69 | 1.24 |
| $10^{th}$ |  | X |  | X | X | X | 0.64 | 1.08 |

Figure 2:
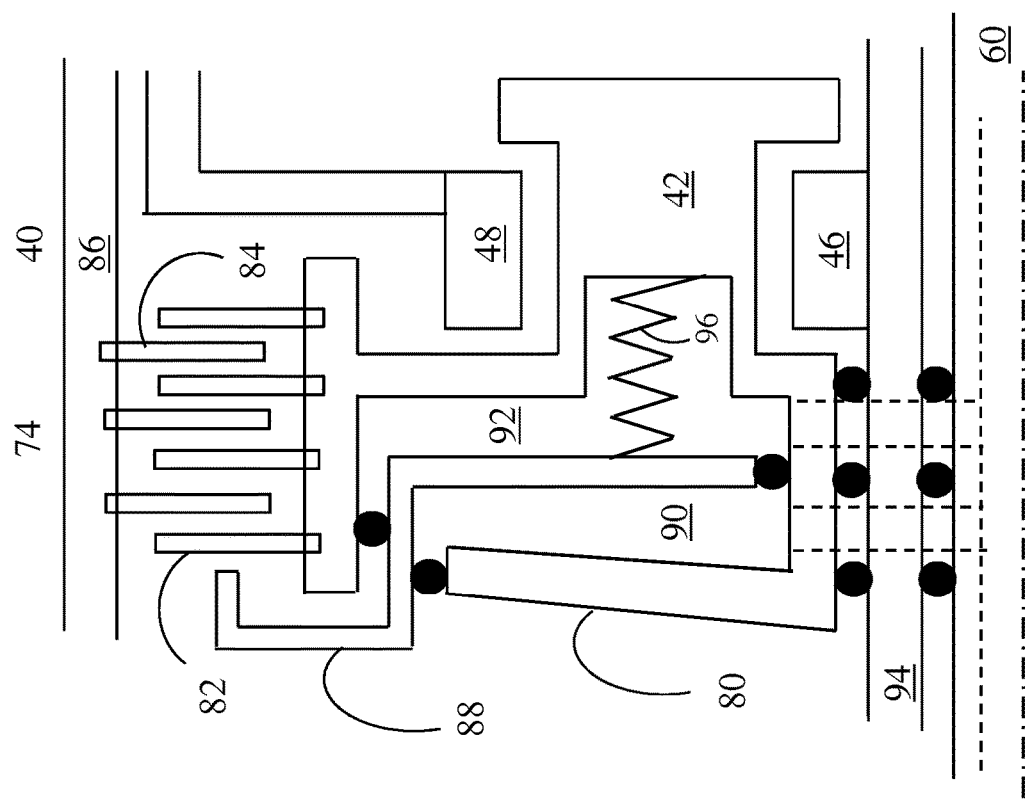
FIG. 2 is a cross section of one of the clutches and one of the planetary gear sets of a transmission according to the gearing arrangement of FIG. 1.

FIG. 2 shows a cross sectional view of the center section of a transmission according to the gearing arrangement of FIG. 1. The cross section of FIG. 2 is taken between the planetary gears 44 of gear set 40. Housing 80 of clutch 74 is integrated with the carrier 42 of gear set 40. A collection of separator plates 82 is splined at their inner edges to housing 80. A collection of friction plates 84 is interleaved with separator plates 82 and splined at their outer edges to shell 86. Shell 86 is fixedly coupled to carrier 22 and ring gear 58. Piston 88 is supported to slide axially within housing 80. The contact points between housing 80 and piston 88 have seals such that housing 80 and piston 88 define two chambers 90 and 92. The chambers have inner and outer diameters defined by the contact points between the housing and the piston. Clutch 74 is engaged by pressurizing fluid in clutch apply chamber 90 such that piston 88 slides toward gear set 40 and compresses friction plates 84 between separator plates 82. When housing 80 rotates, centrifugal forces may pressurize fluid within clutch apply chamber 90 which could potentially result in unintended engagement of clutch 74. However, fluid in balance chamber 92 is subject to the same centrifugal forces, exerting a compensating force on piston 88 to preclude this failure mode. Fluid reaches chambers 90 and 92 via axial passageways in input shaft 60 then through holes in hollow shaft 94. Hollow shaft 94 is fixedly coupled to ring gear 38 and sun gear 46. Return spring 96, which extends into the space between planet gears, forces piston 88 to slide away from gear set 40 when pressure in chamber 90 is relieved.

Figure 3:
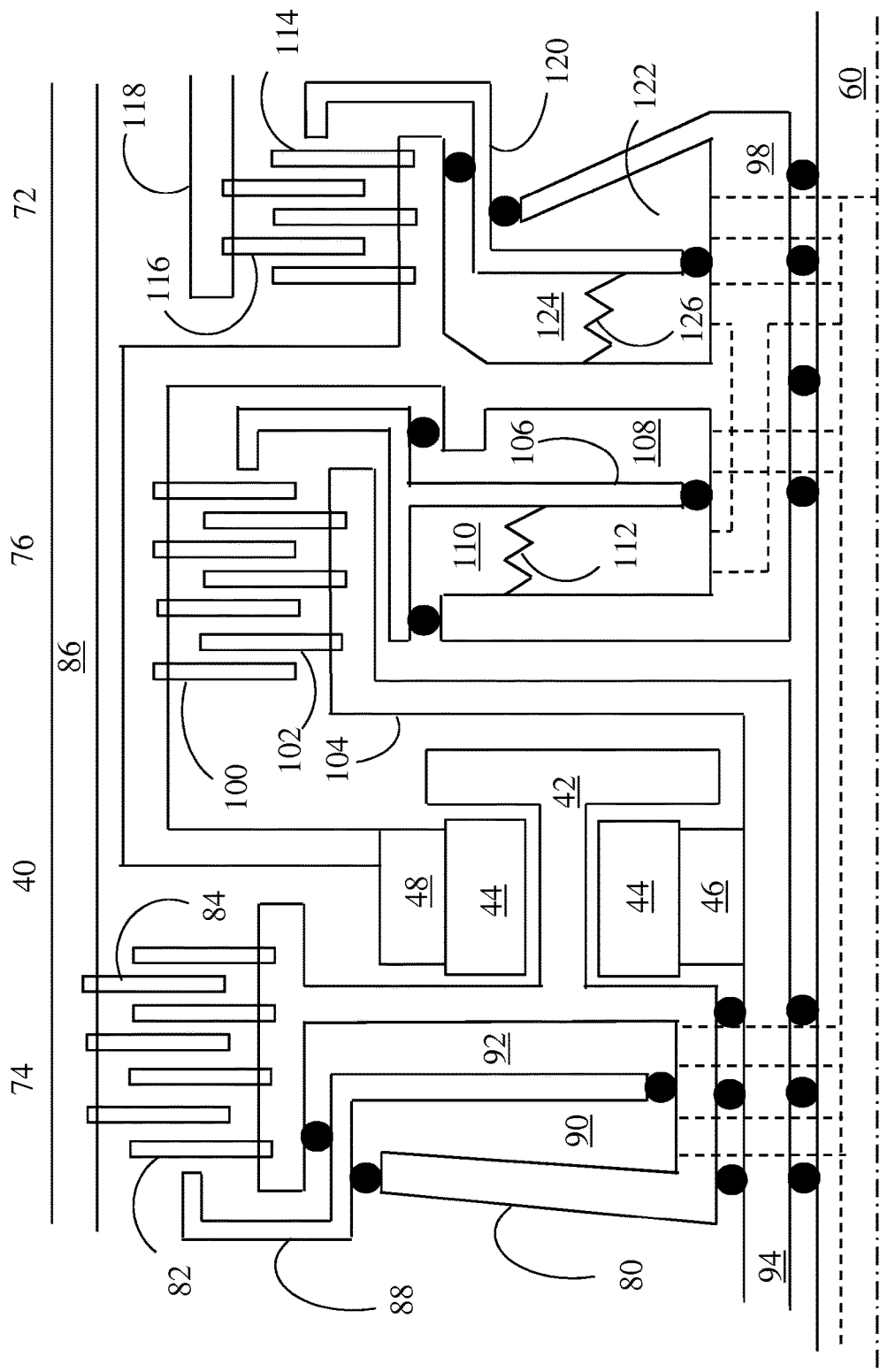
FIG. 3 is a cross section of three of the clutches and one of the planetary gear sets of a transmission according to the gearing arrangement of FIG. 1.

FIG. 3 shows a cross sectional view of a transmission according to the gearing arrangement of FIG. 1 slightly rearward from the view of FIG. 2. The cross section of FIG. 3 is taken through the center of one of the planetary gears 44 of gear set 40. Housing 98 of clutches 72 and 74 is fixedly coupled to ring gear 48 of gear set 40. A collection of separator plates 100 is splined at their outer edges to housing 98. A collection of friction plates 102 is interleaved with separator plates 100 and splined at their inner edges to shell 104. Shell 104 is fixedly coupled to hollow shaft 94. Piston 106 is supported to slide axially within housing 98. Housing 98 and piston 106 define two chambers 108 and 110. Clutch 76 is engaged by pressurizing fluid in clutch apply chamber 108 such that piston 106 slides toward gear set 40 and compresses friction plates 102 between separator plates 100. Centrifugal force acting on the fluid in balance chamber 110 compensates for centrifugal force acting on the fluid in clutch apply chamber 108. Return spring 112 forces piston 106 to slide away from gear set 40 when pressure in chamber 108 is relieved.

A collection of separator plates 114 is splined at their inner edges to housing 98. A collection of friction plates 116 is interleaved with separator plates 114 and splined at their outer edges to shell 118. Shell 118 is fixedly coupled to sun gear 56. Piston 120 is supported to slide axially within housing 98. Housing 98 and piston 120 define two chambers 122 and 124. Clutch 72 is engaged by pressurizing fluid in clutch apply chamber 122 such that piston 120 slides toward gear set 40 and compresses friction plates 116 between separator plates 114. Centrifugal force acting on the fluid in balance chamber 124 compensates for centrifugal force acting on the fluid in clutch apply chamber 120. Return spring 126 forces piston 120 to slide away from gear set 40 when pressure in chamber 122 is relieved. Fluid reaches chambers 108, 110, 122, and 124 via axial passageways in input shaft 60. A passageway within housing 98 connects balance chambers 110 and 124.

Housings 80 and 98 are described as single components. However, they likely would be manufactured in several pieces which are fastened together during assembly. Clutch 74 may be assembled before installation into the transmission. Similarly, clutches 76 and 72 may be assembled into a two clutch module before installation into the transmission.

Figure 4:
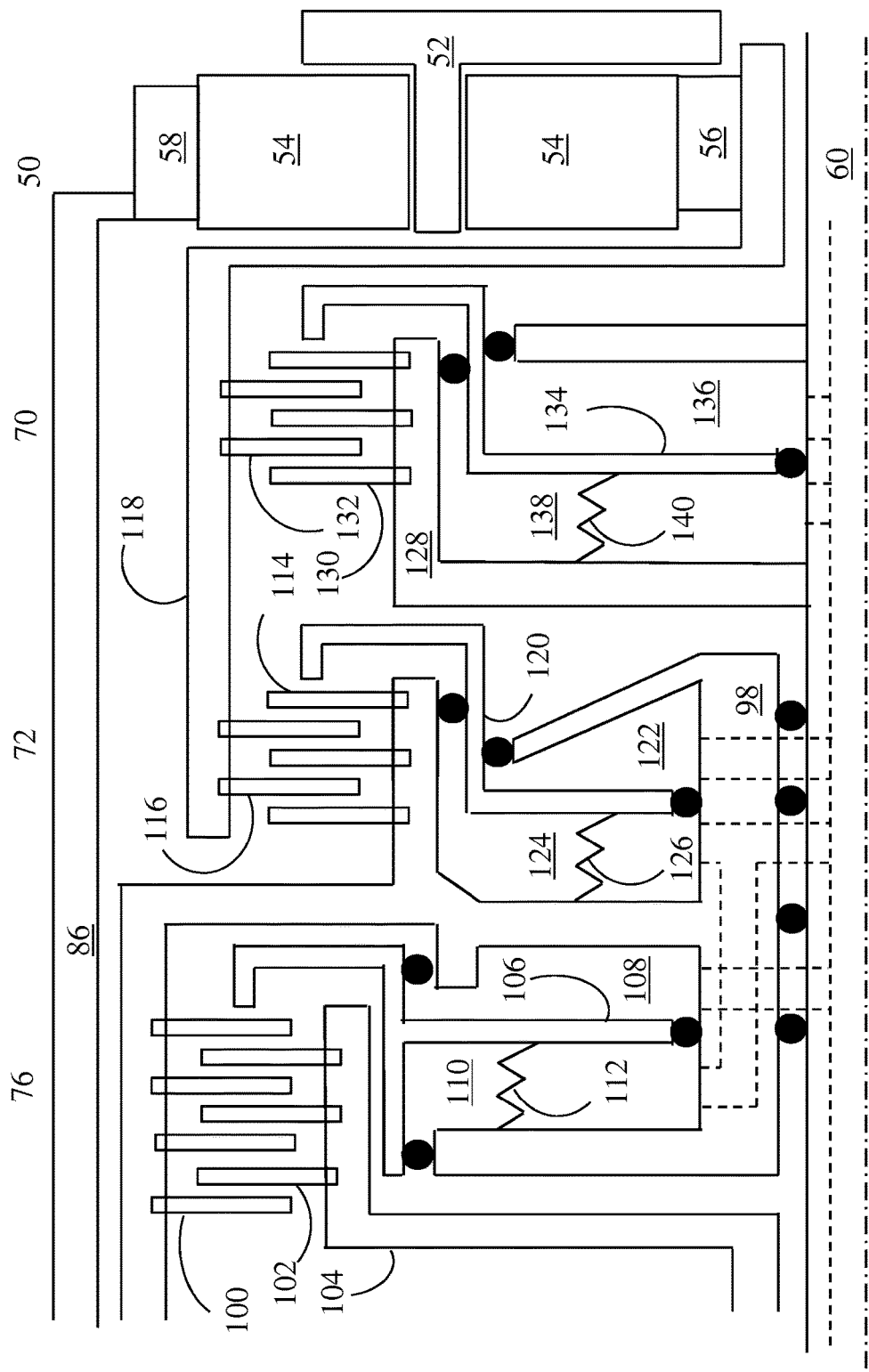
FIG. 4 is a cross section of three of the clutches and one of the planetary gear sets of a transmission according to the gearing arrangement of FIG. 1.

FIG. 4 shows a cross sectional view of a transmission according to the gearing arrangement of FIG. 1 slightly rearward from the view of FIG. 3. Housing 128 of clutch 70 is fixedly coupled to input shaft 60. A collection of separator plates 130 is splined at their inner edges to housing 128. A collection of friction plates 132 is interleaved with separator plates 130 and splined at their outer edges to shell 118. Piston 134 is supported to slide axially within housing 128. Housing 128, piston 134, and input shaft 60 define two chambers 136 and 138. Clutch 70 is engaged by pressurizing fluid in clutch apply chamber 136 such that piston 134 slides toward gear set 40 and compresses friction plates 132 between separator plates 130. Centrifugal force acting on the fluid in balance chamber 138 compensates for centrifugal force acting on the fluid in clutch apply chamber 136. Return spring 140 forces piston 134 to slide away from gear set 40 when pressure in chamber 136 is relieved.

A single passageway in input shaft 60 supplies unpressurized fluid to balance chambers 92, 110, 124, and 138. The same passageway may supply fluid to other parts of the transmission for lubrication. Separate passageways supply clutch apply chambers 90, 108, 122, and 136 such that each clutch may be engaged and disengaged independently of the other clutches. Fluid may flow into these five passageways in input shaft 60 either from a front support, through the output shaft, or a combination of these.

The configuration of clutches in FIGS. 2-4 places the apply chamber and balance chamber at the same axial position and radially inside the respective clutch pack. This reduces the axial length of the transmission relative to placing the clutch packs axially in line with the apply chamber and balance chamber. Since fluid pressure is supplied to the clutches from central shaft, locating the chambers near the centerline reduces the need for radial passageways. Furthermore, since the torque capacity of each clutch is directly proportional to the mean diameter of the clutch pack, locating the clutch packs radially outside of the apply chambers reduces the number of friction plates required or the required area of the apply chamber.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A planetary gear set comprising:
   a planet carrier, sun gear, and ring gear configured to rotate about an axis;
   a plurality of planet gears configured to rotate with respect to the planet carrier and in continuous meshing engagement with the sun gear or the ring gear; and
   a compression spring configured to disengage a clutch and occupying space radially between the sun gear and the ring gear and circumferentially between adjacent planet gears.
2. The planetary gear set of claim 1 wherein each of the planet gears is in continuous meshing engagement with both the sun gear and the ring gear.
3. The planetary gear set of claim 1 further comprising:
   a plurality of separator plates having inner edges splined to the planet carrier;
   at least one friction plate interleaved with the separator plates; and
   a piston configured to apply an axial force to the separator plates.
4. The planetary gear set of claim 3 wherein:
   the planet carrier and the piston define an apply chamber and a balance chamber; and
   the planet carrier defines inner surface openings and defines passageways configured to fluidly connect the apply chamber and the balance chamber to the openings.

* * * * *